United States Patent Office.

EUGEN BAUMANN, OF FREIBURG, BADEN, ASSIGNOR TO FARBENFABRIKEN, VORMALS FR. BAYER & CO., OF ELBERFELD, GERMANY.

SULPHUR COMPOUND.

SPECIFICATION forming part of Letters Patent No. 396,526, dated January 22, 1889.

Application filed November 22, 1888. Serial No. 291,582. (No specimens.)

*To all whom it may concern:*

Be it known that I, EUGEN BAUMANN, a subject of the Emperor of Germany, residing at Freiburg, Grand Duchy of Baden, Germany, have discovered a new and useful Improvement in the Manufacture of a new Pharmaceutical Product, of which the following is a specification.

My invention relates to the manufacture of a new pharmaceutical product with soporific properties, and the chemical name of which is diethylsulphonemethylethylmethane.

I have found that methylethylketone reacts easily with ethylmercaptan in the presence of hydrochloric acid, and that the so formed mercaptol can be oxidized to a new sulphone with oxidizing agents.

In the following I give an exact description of the manner in which the new substance can be manufactured. One molecular proportion of methylethylketone is mixed with two molecular proportions of ethylsulphohydrate, and hydrochloric acid is added. The condensation of the two substances to the new mercaptol goes on immediately according to the following equation:

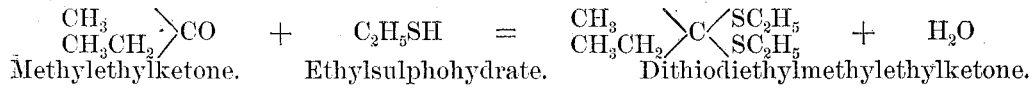

Methylethylketone.    Ethylsulphohydrate.    Dithiodiethylmethylethylketone.

After some hours the reaction is completed, water is added, and the new mercaptol separates as an oil, which, dried with calcium chloride, distills at 198° to 203°, and which has the following chemical constitution,

and the chemical name dithiodiethylmethylethylmethane.

This new mercaptol, which is a colorless oil of an unpleasant odor, can be easily oxidized with permanganate to a new sulphone, which has the following constitution,

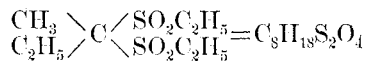

and the chemical name of which is diethylsulphonemethylethylmethane.

One part of the mercaptol is treated with a solution of permanganate under addition of an acid until the permanganate is no longer discolored. The solution is then heated to boiling, filtered, and evaporates.

The new product crystallizes in silvery gleaming scales, melting at 76°. It is sparingly soluble in cold water, easily in hot water, ether, alcohol, and benzene. It melts in boiling water, and has no smell, but a weak, bitter taste.

Having thus described my invention, that which I claim as new, and desire to secure by Letters Patent, is—

The product herein described, being a new sulphone, which has the chemical name diethylsulphonemethylethylmethane, melting at 76°, crystallizing in silvery gleaming scales, difficultly soluble in cold water, easily in ether, alcohol, and benzene, being without smell, but of a weak, bitter taste, and melting in boiling water, substantially as described.

In testimony whereof I have signed my name in presence of two subscribing witnesses.

EUGEN BAUMANN.

Witnesses:
   V. PAUL KRASKE,
     *Professor of Surgery, Freiburg.*
   MAX SCHOTTELIUS,
     *Professor of Medicine, Freiburg.*